Dec. 24, 1968     A. E. VASSILIADES     3,418,656
MICROCAPSULES, PROCESS FOR THEIR FORMATION AND TRANSFER SHEET
RECORD MATERIAL COATED THEREWITH
Filed Oct. 23, 1965     5 Sheets—Sheet 1

INVENTOR
ANTHONY E. VASSILIADES
BY Beale and Jones
ATTORNEYS

' # United States Patent Office 3,418,656
Patented Dec. 24, 1968

3,418,656
MICROCAPSULES, PROCESS FOR THEIR FORMATION AND TRANSFER SHEET RECORD MATERIAL COATED THEREWITH
Anthony E. Vassiliades, Staten Island, N.Y., assignor to U.S. Plywood-Champion Papers Inc., a corporation of New York
Filed Oct. 23, 1965, Ser. No. 503,391
38 Claims. (Cl. 252—316)

ABSTRACT OF THE DISCLOSURE

Microcapsules containing oil-in-water emulsion droplets are produced in the absence of coacervation by admixing a water-immiscible oily material, an amphiphilic emulsifying agent, at least one polymeric resin solution and water, with the water effecting the separation of the resin from solution in solid particle form about a nucleus of oil in water upon dilution therewith as the final operation of the process.

---

This invention relates to the novel microencapsulation of oil-in-water emulsions. More specifically, this invention pertains to the processes for encapsulating minute oil-in-water emulsion droplets, the products produced thereby, and the utility thereof in pressure-responsive, transfer-copy systems.

For about the last ten years, microcapsules containing both liquid and solid nucleus materials have found widespread acceptance in a variety of commercial applications. For example, one of the most widespread utilities has been in the art of transfer-copy systems wherein minute droplets of a colorless dye intermediate dispersed or dissolved in an oil are encapsulated and coated onto a transfer sheet. The dye intermediate is thereafter transferred to a copy sheet by rupturing said capsules. The underlying copy sheet has an adsorbent coating thereon containing a material which will react with the dye intermediate causing a visible colored mark at points where the microcapsules have been ruptured and the dye transferred. Other recent applications in which microcapsules have been used extensively are in adhesives and adhesive tapes, fertilizers, pharmaceuticals, foods and cosmetics.

Soon after the initial developments in microcapsules, several attempts were made to encapsulate minute droplets of an emulsion, either a water-in-oil emulsion or an oil-in-water emulsion. In most of these attempts to date, the "coacervation" phenomenon has been utilized. Microencapsulated emulsions have been used almost exclusively in the pharmaceutical, food and cosmetic industries.

Coacervation is the term applied to the ability of a number of aqueous solutions of colloids, to separate into two liquid layers, one rich in colloid solute and the other poor in colloid solute. Factors which influence this liquid-liquid phase separation are: (a) the colloid concentration, (b) the solvent of the system, (c) the temperature, (d) the addition of another polyelectrolyte, and (e) the addition of a simple electrolyte to the solution.

A unique property of coacervation systems is the fact that the solvent components of the two phases are the same chemical species. This is a major distinguishing characteristic of coacervates as compared to two phase systems involving two immiscible liquids. Thus, a colloidal solute particle migrating across the interface of a two-phase coacervate system finds itself in essentially the same environment on either side of the interface. From the viewpoint of composition, the difference between the two phases is a difference in concentration of solute species. Structurally, the two phases differ in that the colloidal solute of the colloid-poor phase is randomly oriented and the colloidal solute of the coacervate or colloid-rich phase shows a great deal of order. In all cases where coacervation has been observed, the solute species are geometrically anisotropic particles.

Coacervation can be of two general types. The first is called "simple" or "salt" coacervation where liquid phase separation occurs by the addition of a simple electrolyte to a colloidal solution. The second is termed "complex" coacervation where phase separation occurs by the addition of a second colloidal species to a first colloidal solution, the particles of the two dispersed colloids being oppositely charged. Generally, materials capable of exhibiting an electric charge in solution (i.e., materials which possess an ionizable group) are coacervatable. Such materials include natural and synthetic macromolecular species such as gelatin, acacia, tragacanth, styrene-maleic anhydride copolymers, methyl vinyl ether-maleic anhydride copolymers, polymethacrylic acid, and the like.

With both simple and complex coacervate systems, a necessary precondition for coacervation is the reduction of the charge density of the colloidal species. In the case of simple coacervation, this reduction of the charge density along with partial desolvation of the colloidal species is similar to that preceding the flocculation or precipitation of a colloid with the addition of a simple electrolyte since it is known that the addition of more electrolyte to a simple coacervate leads to a shrinking of the colloid-rich layer and the subsequent precipitation of the colloidal species. This same reduction of charge density along with partial desolvation of the colloidal species which precedes the precipitation of two oppositely charged colloids from solution may also be regarded to be the cause for the phase separation in a complex coacervate system. However, while the reduction of the charge density is a necessary precondition for coacervation, it is oftentimes not sufficient for coacervation. In other words, the reduction of the charge density on the colloidal particles must alter or modify the solute-solute interactions to such an extent that the colloidal particles will tend to aggregate and form a distinct, continuous liquid phase rather than a flocculant or a solid phase. This tendency is attributable to both coulombic and long-range Van der Waal's interactions of large aggregates in solution. Thus, in both "simple" and "complex" coacervation, two-solution phase formation begins with the colloidal species aggregating to form submicroscopic clusters; these clusters coalesce to form microscopic droplets. Further coalescence produces macroscopic droplets which tend to separate into a continuous phase. This phase appears as a top or bottom layer depending upon the relative densities of the two layers.

If, prior to the initiation of coacervation, an oil-in-water emulsion comprising oil, water and an emulsifying or thickening agent such as carboxymethylcellulose or gum arabic is dispersed as minute droplets in an aqueous solution or sol of an encapsulating colloidal material, and then, a simple electrolyte, such as sodium sulfate, or another, oppositely charged colloidal species is added to induce coacervation, the encapsulating colloidal material forms around each emulsion droplet, thus investing each of said droplets in a liquid coating of the coacervated colloid. The liquid coatings which surround the emulsion droplets must thereafter be hardened to produce solid-walled microcapsules.

One of the primary disadvantages of the coacervation encapsulation techniques is the fact that critical control over the concentrations of the colloidal material and the coacervation initiator must be maintained. That is, coacervation will occur only within a limited range of pH, colloid concentration and/or electrolyte concentration. For example, in simple coacervation, if a deficiency of the electrolyte is added, two-phase formation will not occur whereas, if an excess is added, the colloid will precipitate as a lumpy mass. With complex coacervation systems using a colloid having an iso-electric point, pH is especially important since the pH must be adjusted and maintained at a point where both colloids have opposite charges. In addition, when a gelable colloid, such as gelatin, is used as the encapsulating material, coacervation must take place at a temperature above the gel point of the colloid.

Another disadvantage in the prior art microcapsules, especially those comprising hydrophilic colloids as the encapsulating material, is the fact that such capsules are sensitive to conditions of high relative humidity and temperature. In many cases, this may be desirable, such as in utilities where delayed release of the nucleus material is sought. However, in the art of pressure-responsive, transfer-copy systems, such action would result in a degradation of the capsule walls and a subsequent premature release of the marking fluid.

One common disadvantage experienced with microcapsules containing colorless leuco dye intermediates and produced according to the prior art methods, is the tendency of the dye intermediates to degrade or decompose on prolonged exposure to heat and light. In encapsulated form, these dye intermediates, which are normally dissolved in an oil vehicle, also show an inability to remain in colorless form for an extended period of time, especially after they have been coated onto a paper or like web. This inability is considered to be due to atmospheric contamination of the capsule contents by virtue of micropores in the capsule walls.

It is, therefore, the object of this invention to provide a process for the microencapsulation of oil-in-water emulsions which is devoid of the coacervation phenomenon and all of the disadvantages inherent therewith.

It is another object of this invention to provide emulsion-containing microcapsules comprising walls of at least one hydrophobic resin.

It is yet another object of this invention to provide a pressure-sensitive and -responsive transfer sheet record material comprising a coating of microcapsules applied to one side of a web material, said microcapsules containing a colorless, leuco dye intermediate dispersed or dissolved in the oil phase of an oil-in-water emulsion and said microcapsules having superior properties in retaining the dye intermediate in colorless form.

These and other objects and features of this invention will become apparent from the following description of the invention and the accompanying drawings.

The aspects of this invention which are capable of illustration are shown in the accompanying drawings wherein.

According to the present invention, a process is provided for the formation of microcapsules comprising solid walls of a hydrophobic resin and containing minute droplets of an oil-in-water emulsion. The process may be described briefly as a simple admixing of at least four ingredients. These ingredients are:

(A) A water-immiscible oily material selected from the group consisting of liquid and low melting oils, fats and waxes;

(B) An amphiphilic emulsifying agent;

(C) At least one solution containing a polymeric resin, said solution selected from the group consisting of:

(1) solutions comprising a hydrophobic, thermoplastic resin as the solute and a water- and oil-miscible organic liquid as the solvent, said thermoplastic resin being capable of being separated from solution upon dilution with water;

(2) solutions comprising a partially condensed, thermosetting resin as the solute and water as the solvent, said resin condensate being capable of being separated from solution upon dilution with water, and (3) mixtures of (1) and (2); and, (D) Water in a quantity sufficient to cause the separation of at least one of said polymeric resins from solution.

The sequence of admixing these ingredients must be such that encapsulation of the emulsion by dilution and ultimate separation with water of at least one of the resin solutions occurs no sooner than simultaneously with the formation of the emulsion. In other words, dilution, which can be performed by the addition of water to the oil-emulsifier-resin solution admixture or by the addition of the resin solution to the water-oil-emulsifier admixture, must be the final operation of the process. Thus, in the first case, the emulsifying operation and the encapsulation operation can be considered to take place simultaneously, whereas, in the second case, the emulsion is already formed when it is admixed with the resin solution.

By "water immiscible oily materials" is meant lipophilic materials which are preferably liquid, such as oils, which will not mix with water and which are inert with regard to the components of the particular system. Low melting fats and waxes may also be used in this invention. However, oils are the preferred nucleus materials since they do not require temperature maintenance. In certain embodiments of this invention, the vapor pressure and viscosity of the oily material are to be considered. For example, in the art of making a transfer sheet record material, a low viscosity-low vapor pressure oil is preferred. The viscosity of the oily medium is a determining factor in the speed with which the markings can be transferred to the copy sheet since low viscosity oils will transfer more quickly than oils of higher viscosity. The vapor pressure should be sufficiently low to avoid substantial losses of the oil through evaporation during the encapsulation operation. A compromise should, therefore, be made in selecting an oil of medium viscosity which will have a reasonable rate of transfer onto the copy sheet and of reasonably low volatility.

In general, the lipophilic nucleus materials can be natural or synthetic oils, fats and waxes or any combination thereof which will meet the requirements of the use for which the microcapsules are intended. Among the materials which can be used are: natural oils, such as cottonseed oil, soybean oil, petroleum lubricating oils, fish liver oils, drying oils and essential oils; synthetic oils, such as methyl salicylate and halogenated biphenyls; low melting fats, such as lard; and liquid or low melting waxes, such as sperm oil and lanolin (wool wax).

Within the scope of the present invention, the herein-disclosed processes may be used to encapsulate an oil-in-water emulsion alone, or alternatively, the oil phase of the emulsion may serve merely as a vehicle for carrying another active ingredient or material. In this latter utility, the active material may be dissolved, dispersed or suspended in the oil phase. The processes of this invention can, therefore, be used to encapsulate medicines, poisons, foods, cosmetics, adhesives or any other material which finds utility in microcapsular form.

In the preferred utility of this invention, viz, transfer sheet record material, these processes may be used to encapsulate an oily printing ink, such as may be used in smudge-proof typewriter ribbons or carbon papers. In such a use, it has been found expedient to encapsulate a colorless, water-insoluble leuco dye intermediate dissolved in the oil phase of the emulsion, thus avoiding the necessity of removing the residual colored matter from the external surfaces of the capsules prior to coating as is required in the encapsulation of printing inks. Colorless leuco dye intermediates are wholly conventional in such utilities and are well known in the art. Exemplary of the colorless dye intermediates which have been contemplated for use in this invention are leuco dyes, such as, crystal violet lactone and derivatives of bis(p-dialkylaminoaryl) methane such as disclosed in U.S. Patent Nos. 2,981,733 and 2,981,738. These dye intermediates are colorless in an alkaline medium and react to form a visible color in an acidic medium. Thus, when a capsule containing such a compound is ruptured and the compound is discharged onto an adsorbent, acidic electron-acceptor material, such as a paper web coated with an organic or an inorganic acid material, visible color appears on the adsorbent material at the point of contact.

Inhibitors may optionally be dispersed in the oily material along with the dye intermediates. Such materials are helpful in preventing the light and heat degradation of the intermediates during the encapsulation procedure, especially when elevated temperatures are required, such as when a fat is used in the emulsion. Inhibitors are also considered to aid in the stabilization of the colored marking on the copy sheet against the effects of the atmosphere. A small amount (generally about 1 to 10% by weight of the dye) of an inhibitor, such as N-phenyl 2-naphthylamine, has been used in the practice of this invention.

The leuco dye intermediates which are mentioned above are, in general, oil soluble. Oils which are inert with respect to the dye and in which the dye has appreciable solubility, e.g., above 0.5 gram of dye per 100 grams of oil, are preferable. In the majority of the experiments of this invention, cottonseed and soybean oils were used.

The emulsions to be encapsulated in the practice of this invention must be stable at least for the duration of the microcapsule formation. Since it is known that oil-water mixtures will not stabilize of their own accord, an emulsifying agent must be incorporated into the system. Selection of the appropriate emulsifier can be based on trial or, preferably, by reference to the hydrophile-lipophile balance (HLB) of the specific materials intended to be used. Based on experimental data, most of the common oils and emulsifiers have ascribed HLB values. Thus, by using these figures, the emulsifier or combination of emulsifiers required to make a stable oil-in-water emulsion can be selected. For example, an emulsifier having an HLB value approximately 10 is necessary to form a stable emulsion of light liquid petrolatum in water. As the HLB of the emulsifier proceeds downwardly to about 4, this oil-in-water emulsion tends to become more unstable and will ultimately invert to a water-in-oil emulsion.

The HLB of blends of two or more emulsifying agents can be calculated by proportion. However, in such combinations, certain antagonisms are evidenced within single classes of emulsifiers. For example, when an aqueous, colloidal dispersion of pigskin gelatin (at a lowered pH) and agar is prepared, a flocculent precipitate having the nature of a coacervate is formed. This formation can be explained by the phenomenon of coacervation since agar is always a negatively charged colloid and gelatin, at a pH below its iso-electric point (which is about pH 9), is highly positive. It follows, therefore, that the gelatin-agar dispersion will be compatible when in an alkaline medium, i.e., when gelatin is above its iso-electric point.

The emulsifying agents to be used in this invention are said to be "amphiphilic." That is, while the emulsifiers are generally preferentially soluble in one phase of the emulsion, they do possess an appreciable affinity for the other phase. It can be said, then, that an amphiphilic emulsifier gives oil a more hydrophilic nature than it had before, and, conversely, gives water a more lipophilic nature. Exemplary of the amphiphilic emulsifying agents which can be used in the instant invention are: naturally-occurring, lyophilic colloids including gums, proteins and polysaccharides, such as, gum arabic, gum tragacanth, agar, gelatin and starch; and synthetic materials such as, methyl cellulose, polyvinyl pyrrolidone, and copolymers of methyl vinyl ether and maleic anhydride.

The thermoplastic resins which function as the encapsulating materials in several embodiments of the present invention must be of a hydrophobic nature. In other words, they should not be capable of dissolving readily in water. While it is true that all resins exhibit some, even though very small hydrophilic properties, those resins acceptable for use in this invention must for the most part be hydrophobic, that is, more lipophilic than hydrophilic.

In general, the thermoplastic resins are to be linear, macromolecular polymers, copolymers, block polymers, and the like. The preferred resins are those containing no ionizable groups since the extent to which a resin ionizes has an ultimate effect on the resin's hydrophilic-hydrophobic properties. Resins such as polyvinyl chloride and polystyrene are non-ionizable and are, therefore, preferred for use in this invention. However, other resins which can be used are polyvinyl acetate, vinyl chloride-vinylidene chloride copolymers, cellulose acetate and ethyl cellulose. Novolak resins which are linear, thermoplastic condensation products of phenol and formaldehyde are also capable of being used in the present invention as the thermoplastic resin. The novolaks are permanently fusible and soluble as long as their molecular structure is linear.

The selection of solvents to be used in the practice of this invention will depend on the specific encapsulating thermoplastic resin and the oil employed. Thus, it must be a solvent for both the oil and the resin and also be miscible with water. If the solvent is not miscible with the oil, the resin may be dissolved preferentially by the oil. The solvent must be miscible with water in order for the resin to be separated from its solution when the oil-resin mixture is admixed with water.

In general, the solvents which are preferable are organic and of low polarity. Tetrahydrofuran has been used successfully with all of the resins heretofore mentioned and is, therefore, the preferred solvent in the practice of this invention. Examples of other solvents which are operable are dioxane, cyclohexanone, methyl tetrahydrofuran, methyl isobutyl ketone and acetone.

A small amount of stabilizer may be incorporated with the solution of the thermoplastic resin to increase the resin's stability towards heat, light and atmospheric oxygen. Examples of stabilizers which may be used include dibasic lead phosphite, dibasic lead stearate, tribasic lead sulfate monohydrate, dibutyltin maleate and others well known to the art. The use of such stabilizers is wholly conventional.

The partially condensed thermosetting resins which can be used in various embodiments of this invention must also be of a hydrophobic nature in their solid, infusible state. These resins comprise that broad class of compositions defined as formaldehyde condensation products and include condensation reaction products of formaldehyde with phenols, such as, hydroxybenzene (phenol), m-cresol and 3,5-xylenol; carbamides, such as, urea; triazines, such as, melamine; amino and amido compounds, such as, aniline, p-toluenesulfonamide, ethyleneurea and guanidine; ketones, such as, acetone and cyclohexanone; aromatic hydrocarbons, such as, naphthalene; and heterocyclic compounds, such as, thiophene. Under the influence of heat, these resins change irreversibly from a fusible and/or soluble material into an infusible and insoluble material.

The preferred formaldehyde condensation products employed in this invention are partially-condensed melamine-formaldehyde, phenol-formaldehyde and urea-formaldehyde resins. These partially condensed resins can be prepared easily according to conventional practices. For example, a melamine-formaldehyde partial condensate or syrup, which was used in a number of the examples enumerated below, is prepared by refluxing 125 grams of melamine in 184 milliliters of formalin (37% by weight formaldehyde) neutralized to a pH of 8 with sodium carbonate. The mole ratio of formaldehyde to melamine in this reaction mixture is 2.3 to 1. The reaction continues for about 1 to 1½ hours at a temperature between 92 and 96° C. or until 1 volume of the condensate becomes turbid when diluted with 2 to 10 volumes of water. The condensate can be used immediately or can be stored for later use by adding a small amount, about 6 to 15% by weight, of methanol to the condensate. The methanol prevents any further rapid condensation of the resin solution upon standing and can be evaporated from the syrup either prior to or during the admixing operation. The resinous condensate or syrup, either with or without methanol, defines an aqueous solution of a partially-condensed, highly cross-linkable resin, said solution being capable of being diluted up to at least twice its volume before any appreciable separation of the resin from its solution occurs. After separation of the resin from its solution, the condensation reaction continues with time to effect additional cross-linking of the partially condensed materials. This additional condensation or cross-linking may be accelerated by the application of heat to the precipitated particles. Thus, microcapsules comprising walls of a thermosetting resin material become harder with the passage of time, and therefore become less pressure sensitive.

Preferably, a small amount of a stabilizer is added to the thermosetting resin syrup in order to improve the stability of the resin towards heat, light and oxygen. In the processes of this invention, from about 0.3 to 0.5% by weight of a conventional stabilizer such as zinc stearate or dibasic lead stearate have been used.

Certain of the emulsifying agents of the type described above give an acidic solution when dissolved in water. When such materials are used to emulsify an oil containing a leuco dye intermediate, a color will naturally be produced since these dye intermediates react in an acid medium. To prevent this, a basic species or buffer may be incorporated in the water of dilution in order to maintain the pH of the system well above seven. Even without such an emulsifier, it is preferable to add this basic species to the system to prevent an undesired or premature reaction of the dye intermediate by virtue of adsorbed carbon dioxide from the atmosphere. In general, from 0.05 to 0.1 gram-equivalents of the material such as sodium carbonate will suffice for such purposes. Such a material in the prescribed amounts does not interfere with the color reaction of the dye intermediates once they have been transferred to a copy sheet containing an electron-acceptor adsorbent material.

The present invention requires that the dilution of either one or both of the resin solutions takes place as the final operation of the process, which dilution takes place slowly and under conditions of brisk agitation. In other words, the sequence of admixing the ingredients may generally proceed in any order so long as the separation or precipitation of a resin from solution results in the encapsulation of emulsion droplets. Thus, when a single resin is to be used, the order of additions must be such that either water or the resin solution is the last addition. In several embodiments of this invention, microcapsules are provided which contain a dispersion comprising one or more emulsion-containing microcapsules. Thus, once an oil-in-water emulsion is encapsulated, a second dilution operation may be effected by simply adding another resin solution to the aqueous dispersion of the first-formed microcapsules. Consequently, microcapsules containing microcapsules are produced.

Brisk agitation is required in order to obtain very small droplets of the emulsion, and, ultimately, very small capsules. Thus, microcapsules having diameters ranging from about 1 to several hundred microns can be produced according to the practices of this invention. Agitation may be achieved by means of a high speed mixer or impeller, by ultrasonic waves or by other conventional means. Brisk agitation need be maintained only in the zone of admixing and not throughout the entire volume of the liquid to which the other liquid is being added.

It has been found that the slower the speed of admixing, the more impermeable the capsule walls will be to both internal and external leakage. Slow admixture may be achieved by any of the conventional means, such as by spraying in the form of a fine mist or by dripping.

Figure 1:
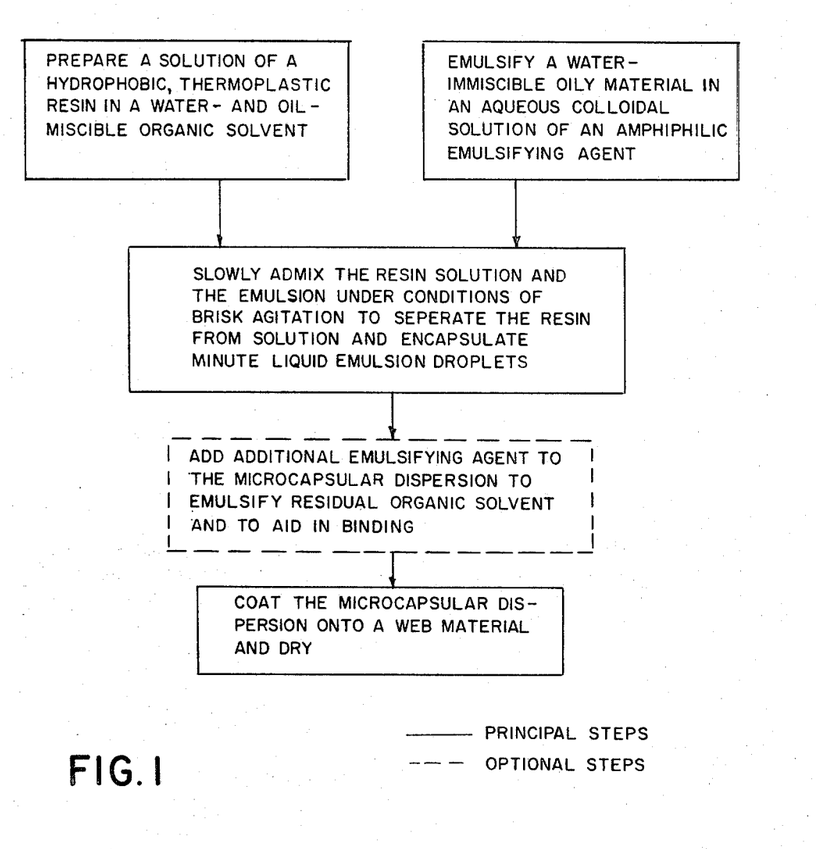
FIGS. 1 through 6 are flow diagrams which outline the steps of alternative encapsulation processes of this invention.

As can be seen by the attached drawings, a variety of encapsulation processes are provided using either thermoplastic resins, thermosetting resins or both. FIG. 1 shows a process by which an oil-in-water emulsion is encapsulated by a thermoplastic resin. The resin, in the form of a solution, is admixed slowly with the emulsion. Preferably, the resin solution is added to the emulsion. However, the admixture may involve the addition of the emulsion to the resin solution. In either case, the thermoplastic resin separates from its original solution as minute, solid particles by reason of the dilution of the resin solution by the water of the emulsion. Each of the particles contains one or more oil-in-water emulsion droplets. On completion of the dilution operation, the admixture constitutes the minute resin particles (each containing droplets of the emulsion) evenly dispersed in an aqueous medium comprising water, the solvent for the resin and residual emulsifying agent. Essentially all of the oily material (in emulsion form) is contained within the resin particles. The thus-formed microcapsular dispersion may be coated directly onto a web material and dried. As an optional step, a small amount of a binder material, which is preferably capable of emulsifying the organic solvent in the dispersion medium, may be added to the microcapsular dispersion prior to coating. Such addition aids in binding the microcapsules to the web material and prevents the unpleasant oil-staining of the web material by the organic solvent in the dispersion.

Figure 2:
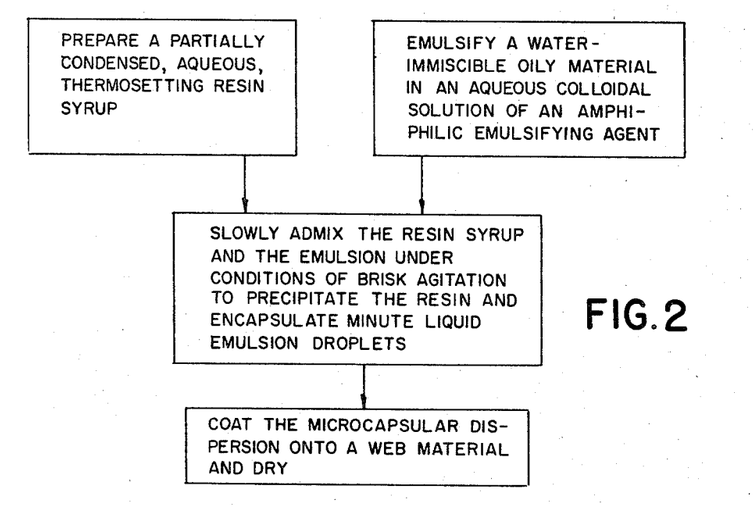
Figure 3:
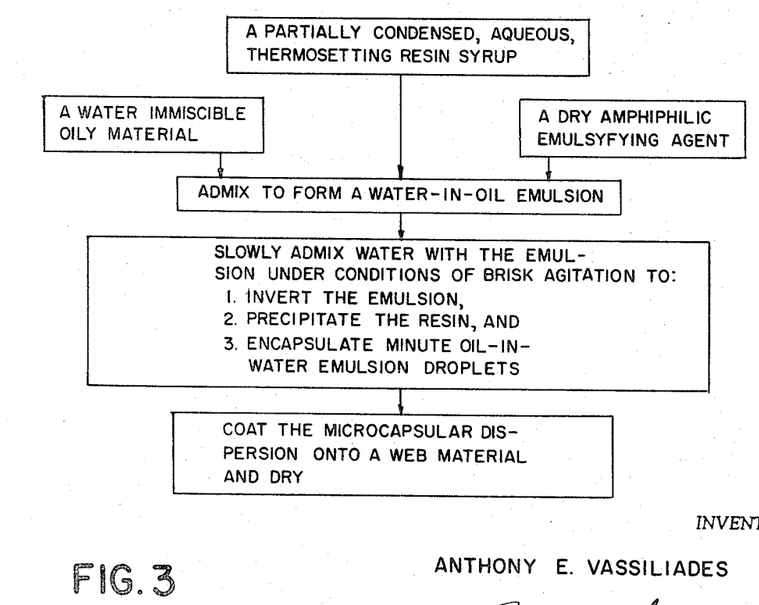

FIGS. 2 and 3 show two alternative processes of the microencapsulation of an oil-in-water emulsion with a thermosetting resin. In FIG. 2, the process shown is substantially the same as that shown in FIG. 1 with the exception that a partially condensed, aqueous, thermosetting resin syrup is substituted for the thermoplastic resin solution. Although not shown in FIG. 2, the optional step of adding a binder material to the microcapsular dispersion prior to coating may be performed.

The process as shown in FIG. 3 involves first preparing a water-in-oil emulsion by admixing the oily material with an amphiphilic emulsifying agent and the thermosetting resin solution. By slowly admixing water with this emulsion, the emulsion will gradually invert to an oil-in-water emulsion. The dilution of the initial emulsion with water simultaneously induces the precipitation of the thermosetting resin, thereby encapsulating the oil-in-water emulsion within the precipitated resin particles. The resulting microcapsules, which are evenly dispersed throughout an aqueous medium containing residual emulsifying agent, may then be coated onto a web material and dried, or, alternatively, an additional amount of a binder may be admixed with the dispersion prior to coating, such as shown in FIG. 1.

Figure 4:
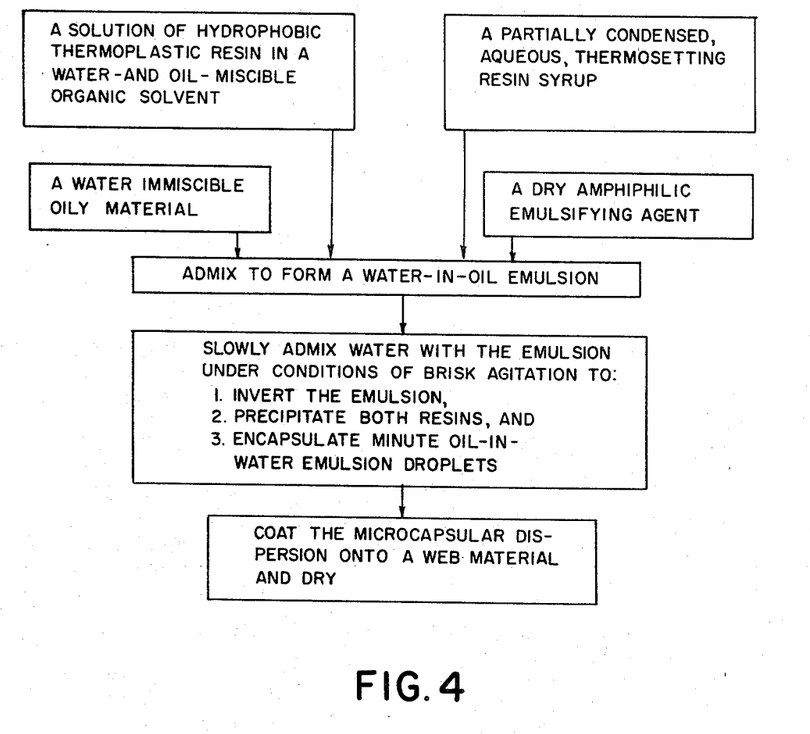
Figure 5:
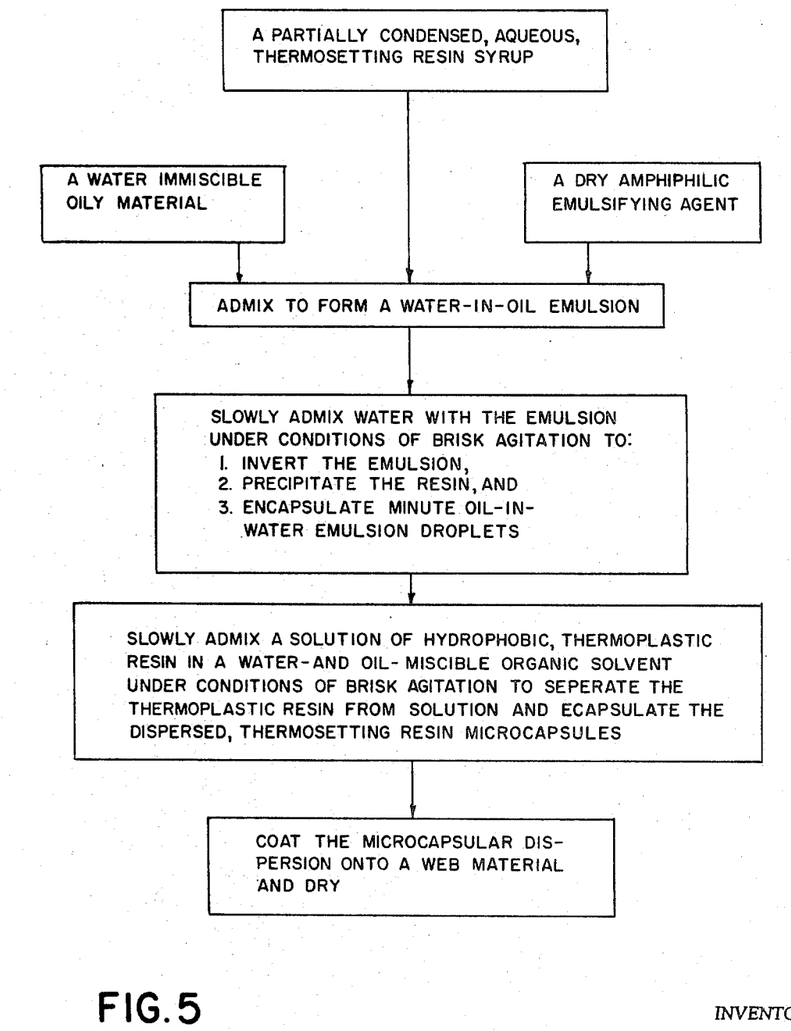
Figure 6:
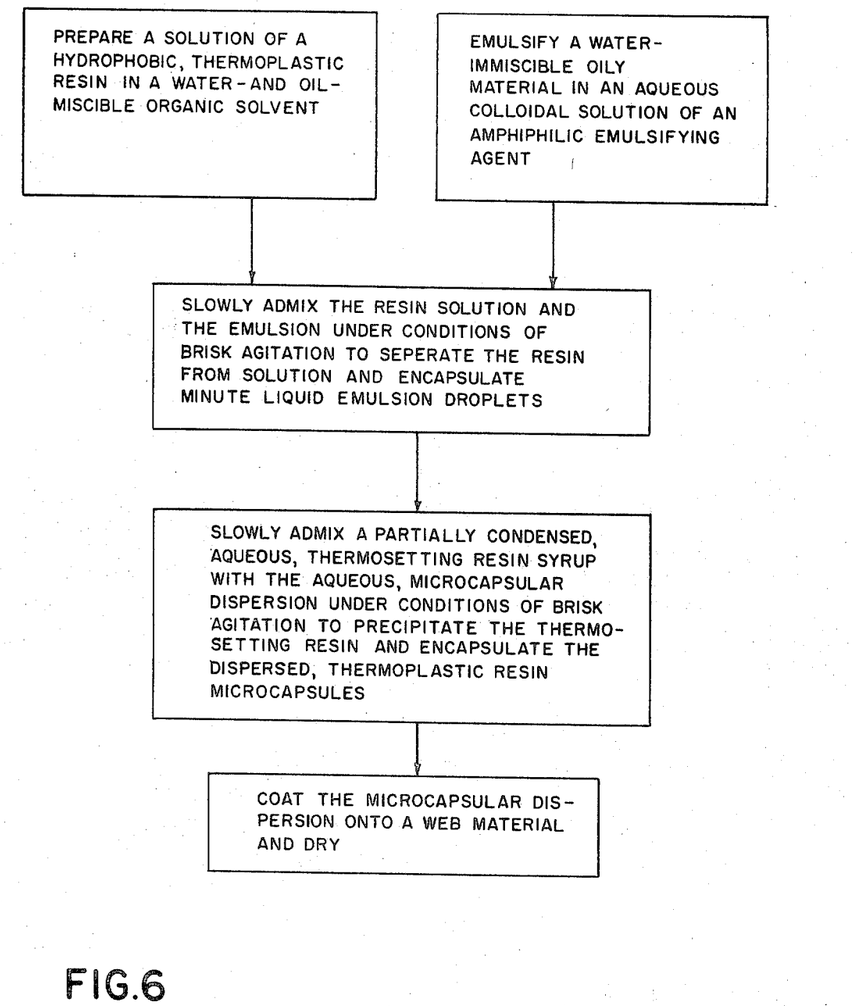

FIGS. 4, 5 and 6 illustrate three alternative processes for the microcapsulation of an oil-in-water emulsion involving both a thermoplastic and a thermosetting resin. In FIG. 4, a process is shown which may be considered a modification of the process shown in FIG. 3. More specifically, the sequence of admixing in the FIG. 4 process is identical to that of FIG. 3, except that a solution of a thermoplastic resin in a water- and oil miscible solvent is added to the initial emulsion prior to dilution with water. On subsequent dilution the emulsion inverts and the resins precipitate to encapsulate the emulsion droplets. The thus formed microcapsules are subsequently coated onto a web material, preferably with the addition of small amount of an emulsifying agent to insure complete emulsification of the residual solvent and to aid in the coating operation.

Both FIGS. 5 and 6 show the encapsulation of microcapsules wherein the initial microencapsulation of the oil-in-water emulsions takes the form of the processes shown in FIGS. 3 and 1, respectively. Thus, in the process of FIG. 5, a thermoplastic resin solution is admixed with the aqueous dispersion of thermosetting resin microcapsules produced according to the process of FIG. 3. The water which is present in the dispersion effects a dilution of the thermoplastic resin solution, which dilution induces the precipitation of the thermoplastic resin. Essentially all of the previously formed thermosetting resin microcapsules are, thereby, encapsulated by the newly precipitated thermoplastic resin. In addition, some of the residual emulsifying agent in the dispersion medium is caused to be entrapped within the thermoplastic resin microcapsules.

Similarly, in the process of FIG. 6, a partially condensed, aqueous, thermosetting resin syrup is admixed with the aqueous dispersion of thermoplastic resin microcapsules produced according to the process of FIG. 1. The water in the dispersion causes the precipitation of the thermosetting resin, thus, encapsulating the dispersed, thermoplastic resin microcapsules. The microcapsules produced in conformance with processes illustrated in FIGS. 5 and 6 may, thereafter, be coated onto a suitable web material, preferably with the aid of an additional binding material as shown in FIG. 1.

The microencapsulated emulsions of this invention are intended to be used in the manufacture of transfer sheet record material. More specifically, capsules containing a leuco dye intermediate in the oil phase of the emulsion are to be coated onto one side of a web material and dried. The coating operation is performed by conventional means, such as by use of an air knife. However, in certain embodiments of this invention, the capsules have been successfully roller coated with only very minimal rupture of the capsules. The capsule coatings are dried by conventional means at temperatures ranging from about 40 to 75° C. At these temperatures, no appreciable degradation of the capsules, and in particular, the leuco dye intermediate, takes place.

The web material commonly used in transfer sheet record material is paper and is, therefore, preferable in the practice of this invention. However, the microcapsules produced by the herein disclosed processes are also capable of being coated onto other materials such as plastic and fabric or textile webs. When using a web material having a high degree of porosity, it is advisable to precoat the web with a material which will reduce seepage of the microcapsular coating through the web. Impregnating the web material with polyvinyl alcohol or a butadiene-styrene latex is the conventional practice for producing an essentially impervious substrate.

Generally, there is sufficient residual emulsifying agent remaining in the microcapsular dispersion after separation of the resin and encapsulation of the emulsion that no additional binding agent need be used. Materials such as gelatin and gum arabic have been used conventionally as binding agents. However, it is preferable to add an additional binder such as methyl cellulose or starch to the system. Binders such as these not only aid in securing the capsules to the web material, but also tend to emulsify any residual solvent left in the system. If the dispersion is left too viscous for coating by such addition, water may be used for adjustment of the viscosity.

Figure 7:
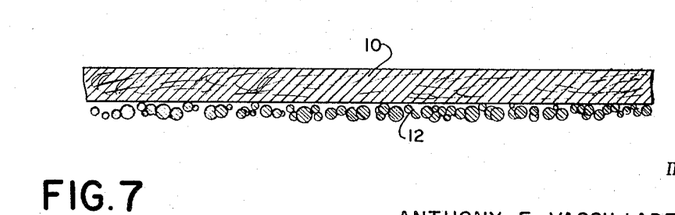
FIG. 7 is a cross-sectional view on an enlarged scale of a portion of a transfer sheet embodying the present invention.

FIG. 7 represents a cross-sectional view of a portion of a transfer sheet record material produced according to the practices of the present invention wherein a paper web material 10 contains a substantially uniform coating of microcapsules 12, each of which contains an oil-in-water emulsion, the oil phase of which contains a colorless leuco dye intermediate. The binding agent used to secure the microcapsular coating to the paper web is not shown.

Transfer sheet made according to the various embodiments of this invention have a pleasant appearance and are almost completely smudge-proof when brought into face-to-face contact with a copy sheet containing a coating of an adsorbent electron-acceptor material. In addition, they show a marked improvement over the transfer sheets presently available in commerce. It has been found that by encapsulating an oil-in-water emulsion, the oil phase of which contains the leuco dye intermediate, the heat and light stability of the dye intermediate is greatly enhanced. Furthermore, there is less chance of a premature color reaction of the dye intermediate. For example, exposure of the coated papers to direct sunlight for five hours, to a temperature of 85° C. for 20 hours, and to a temperature of 70° C. for 18 hours in a 90% relative humidity environment does not alter either the pleasant appearance or the transfer and color-forming properties of the paper.

The following examples illustrate the best modes contemplated for carrying out this invention:

EXAMPLE 1

Three grams of a 1-[bis(p-dimethylaminophenyl)methyl]-pyrrolidine are dissolved in 50 milliliters of cottonseed oil. The oil solution is then emulsified in 120 milliliters of water containing 20 grams of pigskin gelatin and 0.1 gram-equivalents of sodium carbonate. To this emulsion, 15 milliliters of a solution comprising 2 grams of polyvinyl chloride and 0.03 gram of dibasic lead phosphite in tetrahydrofuran are added slowly with brisk agitation. The ensuing dilution of the resin solution with the water from the emulsion causes a separation of the polyvinyl chloride and the inclusion and encapsulation of the emulsion droplets in the precipitated particles of the resin. Subsequently, 12 grams of methyl cellulose are added to the microcapsular dispersion. The resulting dispersion is then coated onto a paper web and dried.

EXAMPLE 2

The identical operation as described in Example 1 is followed in this example substituting polystyrene for polyvinyl chloride as the encapsulating material. Identical results are obtained.

EXAMPLE 3

An emulsion is prepared comprising 50 milliliters of soybean oil containing 3 grams of 1-[bis(p-dimethylaminophenyl)methyl]-pyrrolidine, 30 grams of gum arabic and 150 milliliters of water. To the external phase of this emulsion, 25 milliliters of a 10% by weight polyvinyl acetate solution in tetrahydrofuran are added slowly with brisk agitation. On completion of this addition, 5 grams of methyl cellulose and 6 milliliters of a 5 N solution of sodium carbonate are added to the admixture which is then coated onto a paper web material and dried.

EXAMPLE 4

An emulsion is prepared comprising 25 milliliters of soybean oil containing 1.5 grams of 1-[bis(p-dimethylaminophenyl)methyl]-pyrrolidine, 5 grams of methyl cellulose and 100 milliliters of water. This emulsion is, thereafter, added slowly to 40 milliliters of a 10% by weight polyvinyl acetate solution in tetrahydrofuran. Vigorous stirring accompanies the addition. Two additional grams of methyl cellulose and 6 milliliters of a 5 N sodium carbonate solution are then added to the admixture. The dispersed microcapsules containing the emulsion are thereafter coated onto a paper web and dried.

EXAMPLE 5

About 2 grams of 1-[bis(p-dimethylaminophenyl) methyl]-benzotriazole are dissolved in 35 milliliters of cottonseed oil. The oil solution is then emulsified in 130 milliliters of water containing 5 grams of methyl cellulose. Ten milliliters of a 5 N sodium carbonate solution are also added. The emulsion is then added slowly to 50 milliliters of tetrahydrofuran containing 2.5 grams of ethyl cellulose. As the emulsion is added, the resin solution is maintained in a constant state of vigorous agitation. On completion of the addition, the microcapsular dispersion is coated directly onto a paper web and dried.

EXAMPLE 6

In 150 milliliters of water containing 5 grams of methyl cellulose and 2 milliliters of a 5 N sodium carbonate solution, 25 milliliters of cottonseed oil containing 1.5 grams of 1-[bis(p-dimethylaminophenyl)methyl]-benzotriazole are emulsified. To the external phase of this emulsion, 20 milliliters of acetone containing 2 grams of cellulose acetate are added. This addition takes place slowly and with brisk agitation. After addition of the resin solution, 30 additional milliliters of water are added to the dispersion which is then applied to a paper web and dried.

EXAMPLE 7

A novolak resin is prepared by mixing in a reactor 130 grams phenol, 90.3 grams Formalin (37% by weight formaldehyde in water), and 0.65 grams of oxalic acid in 34.5 milliliters of water. The mixture is heated to boiling and refluxed for 60 minutes. To the partially condensed resin, 3.5 grams of 15% hydrochloric acid is added slowly and the mixture is refluxed for an additional 35 minutes. About 40 to 50 milliliters of cold water are then introduced and the reaction mixture is allowed to cool. On cooling the crude resin precipitates. The resin is then dehydrated by heating and neutralized with the addition of a 37% solution of sodium hydroxide.

A solution is prepared by dissolving 3 grams of the novolak resin in 50 milliliters of tetrahydrofuran. This solution is then added to an emulsion comprising 150 milliliters of water, 5 grams of methyl cellulose and 25 milliliters of cottonseed oil containing 1.5 grams of 1 - [bis(p-dimethylaminophenyl)methyl]-pyrrolidine. The addition of the resin solution of the emulsion takes place slowly and with brisk agitation. The resulting microcapsular dispersion is then coated onto paper and dried.

EXAMPLE 8

An emulsion is prepared by mixing 50 milliliters of cottonseed oil containing 3 grams of 1-[bis(p-dimethylaminophenyl)methyl]-pyrrolidine dye with 50 grams of gum arabic and 100 milliliters of water containing 0.075 gram-equivalents of sodium carbonate. To this emulsion, 25 milliliters of a melamine-formaldehyde syrup are slowly added with brisk agitation. As a result of the dilution of the syrup by the aqueous medium of the emulsion, the melamine-formaldehyde resin separates from its own aqueous medium, thus encapsulating the emulsion droplets. The melamine-formaldehyde microcapsules, which remain dispersed in the viscous emulsion medium are then coated onto a paper web and dried at about 50 to 60° C.

EXAMPLE 9

A mixture is prepared comprising 50 milliliters of cottonseed oil containing 3 grams of 1-[bis(p-dimethylaminophenyl)methyl]-pyrrolidine and 50 grams of gum arabic. Slowly and with brisk stirring, 50 milliliters of a melamine-formaldehyde syrup are added to the above mixture. With continued stirring, 100 milliliters of water containing 0.075 gram-equivalents of sodium carbonate are slowly added. This addition results in the separation of the resin from the system in the form of microcapsules which contain minute droplets of a dye-containing oil-in-water emulsion and are evenly dispersed throughout the emulsion medium. The melamine-formaldehyde microcapsular dispersion is then coated onto a paper web with the aid of 10 grams of methyl cellulose added to the dispersion as a binding agent and dried at about 50 to 60° C.

EXAMPLE 10

A mixture of 50 milliliters of a melamine-formaldehyde syrup and 50 milliliters of cottonseed oil containing 3 grams of 1-[bis(p-dimethylaminophenyl)methyl]-benzotriazole is first prepared. To this mixture, 40 grams of gum arabic are added. To the external phase of the resulting emulsion, 100 milliliters of water containing 0.075 gram-equivalents of sodium carbonate are added slowly with brisk stirring, thereby precipitating the resin and encapsulating therein minute oil-in-water emulsion droplets. The microcapsules are thereafter coated onto paper and dried.

EXAMPLE 11

To 50 milliliters of cottonseed oil containing 1-[bis(p-dimethylaminophenyl)methyl]-benzotriazole and 1 gram of N-phenyl 2-naphthylamine, 100 milliliters of tetrahydrofuran, containing 10 grams of polystyrene and 0.25 gram of dibasic lead phosphite, and 50 milliliters of a melamine-formaldehyde syrup containing 0.25 gram of zinc stearate are added. To this mixture, 50 grams of gum arabic are added, followed by the addition of 100 milliliters of water containing 0.075 gram-equivalents of sodium carbonate. The resulting microcapsules are evenly dispersed in the aqueous medium. Ten grams of methyl cellulose is then added to the dispersion, which is thereafter coated onto paper and dried.

EXAMPLE 12

Fifty milliliters of cottonseed oil containing 4 grams of 1 - [bis(p-dimethylaminophenyl)methyl]-pyrrolidine and 1 gram of N-phenyl 2-naphthylamine are mixed with 50 milliliters of a melamine-formaldehyde syrup containing 0.25 gram of zinc stearate and emulsified with 50 grams of gum arabic to obtain a water-in-oil emulsion. To the external phase of this emulsion, 100 milliliters of water containing 0.075 gram-equivalents of sodium carbonate are slowly added with vigorous stirring. The thus-produced microcapsules, which contain oil-in-water emulsion droplets, are evenly dispersed throughout the aqueous medium. Subsequently, 10 milliliters of tetrahydrofuran containing 1 gram of polyvinyl chloride and 0.25 gram of dibasic lead phosphite are added slowly and with vigorous mixing to this medium. During this addition, the polyvinyl chloride resin is caused to precipitate, thus encapsulating the previously-formed melamine-formaldehyde microcapsular dispersion. Ten grams of methyl cellulose are then added to the dispersion and this mixture is roller coated onto a paper web and dried at a temperature of about 50 to 60° C.

EXAMPLE 13

To 100 milliliters of water containing 0.075 gram-equivalents of sodium carbonate, 40 grams of gum arabic are added. Fifty milliliters of cottonseed oil containing 4 grams of 1-[bis(p-dimethylaminophenyl)methyl]-pyrrolidine and 1 gram of N-phenyl 2-naphthylamine are then emulsified in the above solution. To the external phase of this emulsion, a solution comprising 10 milliliters of tetrahydrofuran and 1 gram polyvinyl chloride are added slowly with brisk agitation, thus causing the precipitation of the resin and the simultaneous encapsulation of the emulsion droplets. The thus-formed microcapsules remain evenly dispersed throughout the viscous aqueous medium. With continued agitation, 20 milliliters of a melamine-formaldehyde syrup containing 0.25 gram of zinc stearate are slowly added. During this addition, the melamine-formaldehyde resin is caused to precipitate, thus encapsulating the polyvinyl chloride microcapsular dispersion. Ten grams of methyl cellulose are then added to the dispersion and this mixture is coated onto a paper web and dried.

Although the invention has been described in considerable detail with particular reference to certain preferred embodiments thereof, variations and modifications can be effected within the spirit and scope of the invention as described hereinbefore, and as defined in the appended claims.

I claim:

1. A process for the formation of microcapsules in the absence of coacervation, the capsule walls of which comprise at least one essentially impermeable precipitate of a hydrophobic resin, said microcapsules containing minute droplets of an oil-in-water emulsion comprising a water-immiscible oily material as the disperse phase and an aqueous colloidal solution of an amphiphilic emulsifying agent as the dispersion medium, said process comprising admixing
   (A) a water-immiscible oily material selected from the group consisting of liquid and low melting oils, fats and waxes;
   (B) an amphiphilic emulsifying agent;
   (C) at least one solution comprising a polymeric resin, said solution selected from the group consisting of;
      (1) solutions comprising a hydrophobic, thermoplastic resin as the solute and a water- and oil-miscible organic liquid as the solvent, said thermoplastic resin being capable of being separated in solid particle form from solution upon dilution with water,
      (2) solutions comprising a partially condensed thermosetting resin as the solute and water as the solvent, said resin condensate being capable of being separated in solid particle form from solution upon dilution with water, and
      (3) mixtures of (1) and (2); and,
   (D) water in a quantity sufficient to cause the separation of at least one of said polymeric resins from solution,
the sequence of said admixing being such that at least one of the synthetic resins in the admixture separates from solution in solid particle form about a nucleus of oil in water upon dilution with water as the final operation of said process, which dilution takes place slowly and under conditions of brisk agitation.

2. A process as defined in claim 1 wherein the oil phase of said oil-in-water emulsion contains therein a colorless dye intermediate.

3. Pressure-rupturable microcapsules made according to the process of claim 1.

4. Pressure-rupturable microcapsules made according to the process of claim 2.

5. A pressure-sensitive transfer sheet record material for use in a transfer-copy system having on one side thereof a coating microcapsules as defined by claim 4.

6. A process for the formation of microcapsules in the absence of coacervation, the capsule walls of which comprise an essentially impermeable precipitate of a hydrophobic, thermoplastic resin, said microcapsules containing minute droplets of an oil-in-water emulsion comprising a water-immiscible oily material as the disperse phase and an aqueous colloidal solution of an amphiphilic emulsifying agent is the dispersion medium, said process comprising admixing
   (A) a water-immiscible oily material selected from the group consisting of liquid and low melting oils, fats and waxes;
   (B) an amphiphilic emulsifying agent;
   (C) at least one solution comprising a hydrophobic, thermoplastic resin as the solute and a water- and oil-miscible organic liquid as the solvent, said thermoplastic resin being capable of being separated in solid particle form from solution upon dilution with water; and
   (D) water in a quantity sufficient to cause the separation of at least one of said thermoplastic resins from solution,
the sequence of said admixing being such that at least one of said thermoplastic resins in the admixture separates from solution in solid particle form about a nucleus of oil in water upon dilution with water as the final operation of said process, which dilution takes place slowly and under conditions of brisk agitation.

7. A process as defined in claim 6 wherein at least one solution comprising a hydrophobic, thermoplastic resin as the solute and a water- and oil-miscible organic liquid as the solvent is added to an oil-in-water emulsion comprising a water-immiscible oily material as the disperse phase and an aqueous colloidal solution of an amphiphilic emulsifying agent as the dispersion medium.

8. A process as defined in claim 6 wherein an oil-in-water emulsion comprising a water-immiscible oily material as the disperse phase and an aqueous colloidal solution of an amphiphilic emulsifying medium is added to a solution comprising at least one hydrophobic, thermoplastic resin as the solute and a water- and oil-miscible organic liquid as the solvent.

9. A process as defined in claim 6 wherein the oil phase of said oil-in-water emulsion contains therein a colorless dye intermediate.

10. Pressure-rupturable microcapsules made according to the process of claim 6.

11. Pressure-rupturable microcapsules made according to the process of claim 9.

12. A pressure-sensitive transfer sheet record material for use in a transfer-copy system having on one side thereof a coating of microcapsules as defined by claim 11.

13. A process as defined in claim 6 wherein said dilution is followed by the addition of at least one solution comprising a partially condensed, thermosetting resin as the solute and water as the solvent, said resin condensate being capable of being separated from solution upon dilution with the water in said admixture, whereby said thermosetting resin separates from solution and encapsulates the previously formed microcapsules.

14. A process as defined in claim 13 wherein the oil phase of said oil-in-water emulsion contains therein a colorless dye intermediate.

15. Pressure-rupturable microcapsules made according to the process of claim 13.

16. Pressure-rupturable microcapsules made according to the process of claim 14.

17. A pressure-sensitive transfer sheet record material for use in a transfer-copy system having on one side thereof a coating of microcapsules as defined by claim 16.

18. A process for the formation of microcapsules in the absence of coacervation, the capsule walls of which comprise an essentially impermeable precipitate of a hydrophobic, partially condensed, thermosetting resin, said microcapsules containing minute droplets of an oil-in-water emulsion comprising a water-immiscible oily material as the disperse phase and an aqueous, colloidal solution of an amphiphilic emulsifying agent as the dispersion medium, said process comprising admixing
   (A) a water-immiscible oily material selected from the group consisting of liquid and low melting oils, fats, and waxes;
   (B) an amphiphilic emulsifying agent;
   (C) at least one solution comprising a partially condensed, thermosetting resin as the solute and water as the solvent, said resin condensate being capable of being separated from solution in solid particle form upon dilution with water; and
   (D) water in a quantity sufficient to cause the separation of at least one of said thermosetting resins from solution,
the sequence of said admixing being such that at least one of said thermosetting resins in the admixture separates from solution in solid particle form about a nucleus of oil in water upon dilution with water as the final operation of said process, which dilution takes place slowly and under conditions of brisk agitation.

19. A process as defined in claim 18 wherein at least one solution comprising a partially condensed, thermosetting resin as the solute and water as the solvent is added to an oil-in-water emulsion comprising a water-immiscible oily material as the disperse phase and an aqueous, colloidal solution of an amphiphilic emulsifying agent as the dispersion medium.

20. A process as defined in claim 18 wherein an oil-in-water emulsion comprising a water-immiscible oily material as the disperse phase and an aqueous, colloidal solution of an amphiphilic emulsifying agent as the dispersion medium is added to at least one solution comprising a partially condensed, thermosetting resin as the solute and water as the solvent.

21. A process as defined in claim 18 wherein water is added to an admixture comprising a water-immiscible oily material, an amphiphilic emulsifying agent and at least one solution comprising a partially condensed, thermosetting resin as the solute and water as the solvent.

22. A process as defined in claim 18 wherein an admixture comprising a water-immiscible oily material, an amphiphilic emulsifying agent and at least one solution comprising a partially condensed, thermosetting resin as the solute and water as the solvent is added to water.

23. A process as defined in claim 18 wherein the oil phase of said oil-in-water emulsion contains therein a colorless dye intermediate.

24. Pressure-rupturable microcapsules made according to the process of claim 18.

25. Pressure-rupturable microcapsules made according to the process of claim 23.

26. A pressure-sensitive transfer sheet record material for use in a transfer-copy system having on one side thereof a coating of microcapsules as defined by claim 25.

27. A process as defined in claim 18 wherein said dilution is followed by the addition of at least one solution comprising a hydrophobic, thermoplastic resin as the solute and a water- and oil-miscible organic liquid as the solvent, said thermoplastic resin being capable of being separated from solution upon dilution with the water in said admixture, whereby said thermoplastic resin separates from solution and encapsulates the previously formed microcapsules.

28. A process as defined in claim 27 wherein the oil phase of said oil-in-water emulsion contains therein a colorless dye intermediate.

29. Pressure-rupturable microcapsules made according to the process of claim 27.

30. Pressure-rupturable microcapsules made according to the process of claim 28.

31. A pressure-sensitive transfer sheet record material for use in a transfer-copy system having on one side thereof a coating of microcapsules as defined by claim 30.

32. A process for the formulation of microcapsules in the absence of coacervation, the capsule walls of which comprise essentially impermeable precipitates of at least two hydrophobic resins, at least one of which is a thermoplastic resin, and at least one of which is a partially condensed, thermosetting resin, said microcapsules containing minute droplets of an oil-in-water emulsion comprising a water-immiscible oily material as the disperse phase and an aqueous colloidal solution of an amphiphilic emulsifying agent as the dispersion medium, said process comprising admixing (A) a water-immiscible oily material selected from the group consisting of liquid and low melting oils, fats and waxes;
(B) an amphiphilic emulsifying agent;
(C) at least one solution comprising a hydrophobic, thermoplastic resin as the solute and a water- and oil-miscible organic liquid as the solvent, said thermoplastic resin being capable of being separated in solid particle form from solution upon dilution with water; and
(D) at least one solution comprising a partially condensed, thermosetting resin as the solute and water as the solvent, said resin condensate being capable of being separated in solid particle form from solution upon dilution with water; and
(E) water in a volumetric quantity sufficient to cause the separation of at least one of said thermoplastic resins in solid particle form from solution and at least one of said thermosetting resins in solid particle form from solution, the sequence of said admixing being such that essentially all of said resins in the admixture separate in solid particle form about a nucleus of oil in water from solution upon dilution with water as the final operation of said process, which dilution takes place slowly and under conditions of brisk agitation.

33. A process as defined in claim 32 wherein the oil phase of said oil-in-water emulsion contains therein a colorless dye intermediate.

34. Pressure-rupturable microcapsules made according to the process of claim 32.

35. Pressure-rupturable microcapsules made according to the process of claim 33.

36. A pressure-sensitive transfer sheet record material for use in a transfer-copy system having on one side thereof a coating of microcapsules as defined by claim 35.

37. A process as defined in claim 6 wherein the hydrophobic, thermoplastic resin is polystyrene.

38. A process as defined in claim 18 wherein the hydrophobic, partially condensed, thermosetting resin is urea-formaldehyde.

References Cited

UNITED STATES PATENTS

| 3,016,308 | 1/1962 | Macaulay | 252—316 X |
| 3,043,782 | 7/1962 | Jensen | 252—316 |
| 3,265,629 | 8/1966 | Jensen | 252—316 |

FOREIGN PATENTS

| 929,409 | 6/1963 | Great Britain. |

RICHARD D. LOVERING, *Primary Examiner.*